April 18, 1944.  J. D. CATON  2,347,081
TRAILER HITCH
Filed Aug. 26, 1942
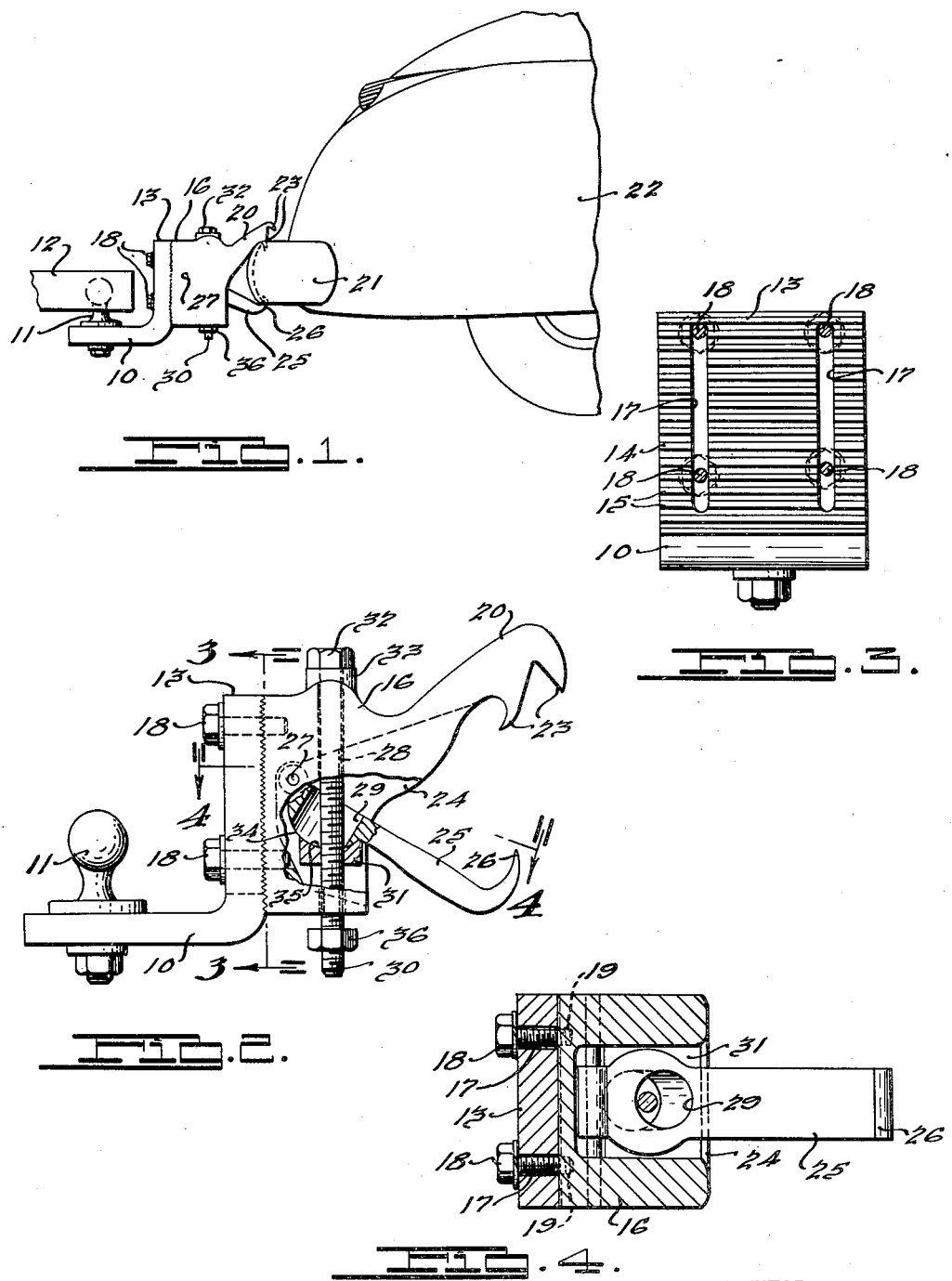
INVENTOR
JOSEPH DOUGLAS CATON
BY
Harness, Lind, Pates & Harris.
ATTORNEYS Patented Apr. 18, 1944

2,347,081

UNITED STATES PATENT OFFICE 2,347,081

TRAILER HITCH

Joseph Douglas Caton, Detroit, Mich., assignor to Chrysler Corporation, Highland Park, Mich., a corporation of Delaware Application August 26, 1942, Serial No. 456,134

8 Claims. (Cl. 280—33.44)

My present invention relates to trailer hitches, by which I mean a device capable of attaching one movable vehicle to another so that one of said vehicles may draw the other along a road or other surface. The trailer hitch may be used to attach a trailer to an automotive vehicle, to attach one driven automotive vehicle to a drawn automotive vehicle so as to permit the two vehicles to be moved under control of a single driver, or to attach utility devices such as portable fire extinguishing units, air compressor units, or the like, to an automotive vehicle.

The present invention is designed to unite the driven vehicle to the drawn vehicle through the medium of a bumper clamp and comprises a vertically adjustable fixed bumper hook having a pivoted bumper hook mounted thereon, which hooks are adapted to be clamped in position by means of a simple, sturdy, operating mechanism.

The objects and advantages of the present invention will be more readily apparent to those skilled in the art after a study of the following specification taken in connection with the accompanying drawing wherein like numerals refer to like parts throughout.

In the drawing,

Fig. 1 is a side elevation of the present invention in use;

Fig. 2 is a side elevation on an enlarged scale with parts broken away to illustrate details of the present invention;

Fig. 3 is a sectional view taken substantially along line 3—3 of Fig. 2; and

Fig. 4 is a sectional view taken substantially along line 4—4 of Fig. 2.

The invention comprises a member 10 adapted to form part of a universal pivot, the member having a ball pin 11 projecting upwardly from its rear end for that purpose, the ball of the pin being adapted to fit into a socket in the draw bar 12 which is attached to the drawn vehicle (not shown). The member 10 forms part of a vertically adjustable joint, being provided for this purpose with a substantially vertical arm 13 having a vertical, forwardly facing surface 14 provided with a plurality of horizontal ridges 15 adapted to mesh with similar horizontal ridges on an opposed vertical face of a vertically adjustable fixed bumper hook member 16. The arm 13 is provided with a pair of vertical slots 17 adapted to receive bolts 18 passed freely therethrough into threaded sockets 19 in the vertical face of the member 16. The bolts 18 may be loosened to permit vertical adjustment of the member 16 upward from its illustrated position, and if desired the member 16 may be provided with a plurality of threaded sockets 19 for affording a greater degree of vertical adjustment.

The member 16 is provided with a hooked arm 20 which is adapted to hook over the upper edge of a bumper 21, or the like, on the driven vehicle 22. The arm 20 may be provided with a plurality of hooks 23 for the purpose of engaging the upper edges of different styles of bumpers. The member 16 is provided with a central forwardly opening cavity 24 within which is pivoted a movable bumper hook 25 provided with a hook 26 adapted to hook under the lower edge of a bumper to which the fixed bumper hook has been adjusted. The movable bumper hook is pivoted about a transverse pivotal axis provided by a pin 27 extending horizontally through the inner end of the cavity 24. The member 16 is also provided with a vertical bore 28 centrally intersecting the cavity 24, and the pivoted bumper hook 25 is provided with an opening 29 of considerable extent and so arranged as to present an open space to the projection of the bore 28 throughout a considerable range of movement of the bumper hook about its pivotal axis. A bolt 30 is slid longitudinally through the bore 28 and the opening 29 and a rider nut 31 is in threaded engagement with said bolt within the confines of the cavity 24 and resting against the lower surface of the movable hook 25. Rotation of said bolt relative to said rider nut causes vertical movement of said rider nut and vertical swinging of the movable hook 25.

The head 32 of bolt 30 is preferably engaged with the upper surface of a washer or integral boss 33 so as to be projected above the upper surface of the member 16 for ready engagement thereof by a wrench or other similar tool. In order that the rider nut 31 may be held against rotation when the bolt 30 is rotated, the nut may be made so as to have its sides in engagement with portions of the side walls of the cavity 24, and the side walls of the cavity 24 are therefore parallel and substantially vertical so that the nut 31 may move vertically when the bolt is rotated. The lower surface of the hook 25 may be provided with a rounded projection 34 within which the opening 29 is centrally located and the upper surface of the nut 31 may be provided with a complementary rounded surface 35 within which the rounded projection 34 rests, the surfaces thus giving greater bearing support to the hooked arm 25. The lower end of the bolt 30 may be provided with a locking nut 36 to prevent accidental loosening of the trailer hitch when in use.

Having illustrated and described the preferred embodiment of my present invention, it should be apparent to those skilled in the art that the same permits of various modifications in detail and arrangement. All such modifications as come within the scope of the following claims are to be considered a part of my invention.

I claim:

1. A trailer hitch comprising a support having a vertically upstanding portion provided with a horizontally serrated side, a fixed bumper hook member having a base portion provided with a serrated side for mating with said serrated side of said support and having a projecting part adapted to hook over the upper edge of a vehicle bumper or the like, said fixed bumper hook member having a central cavity therein and a vertical bore intersecting said cavity, means coacting with said serrated sides of said support and said hook member for releasably holding the latter in a selected one of a plurality of vertically spaced positions, an opposed movable bumper hook transversely pivoted within said cavity and adapted to hook under the lower edge of a bumper, said movable bumper hook having an opening therethrough of considerable extent and so positioned as to present an open space to the projection of said vertical bore throughout a considerable range of movement of said movable bumper hook about its transverse pivotal axis, a threaded bolt freely passed through said bore and said opening, and a rider nut in threaded engagement with said bolt within the confines of said cavity and in engagement with the lower side of said movable bumper hook.

2. A trailer hitch comprising a fixed bumper hook adapted to hook over the upper edge of a vehicle bumper or the like, said fixed bumper hook having a central cavity therein and a vertical bore intersecting said cavity, an opposed movable bumper hook transversely pivoted within said cavity and adapted to hook under the lower edge of a bumper, said movable bumper hook having an opening therethrough of considerable extent and so positioned as to present an open space to the projection of said vertical bore throughout a considerable range of movement of said movable bumper hook about its transverse pivotal axis, a threaded bolt freely passed through said bore and said opening, and a rider nut in threaded engagement with said bolt within the confines of said cavity and in engagement with the lower side of said movable bumper hook, said rider nut being restrained against rotation by engagement with the sides of said cavity and the sides of said cavity being substantially vertical whereby rotation of said bolt causes vertical movement of said rider nut and pivotal movement of said movable bumper hook toward or away from said fixed bumper hook.

3. A trailer hitch comprising a fixed bumper hook adapted to hook over the upper edge of a vehicle bumper or the like, said fixed bumper hook having a central cavity therein and a vertical bore intersecting said cavity, an opposed movable bumper hook transversely pivoted within said cavity and adapted to hook under the lower edge of a bumper, said movable bumper hook having an opening therethrough of considerable extent and so positioned as to present an open space to the projection of said vertical bore throughout a considerable range of movement of said movable bumper hook about its transverse pivotal axis, a threaded bolt freely passed through said bore and said opening, and a rider nut in threaded engagement with said bolt within the confines of said cavity and in engagement with the lower side of said movable bumper hook, said rider nut being restrained against rotation by engagement with the sides of said cavity and the sides of said cavity being substantially vertical whereby rotation of said bolt causes vertical movement of said rider nut and pivotal movement of said movable bumper hook toward or away from said fixed bumper hook, said movable bumper hook having a rounded projection on its lower surface and said rider nut having a complementary rounded cavity in its upper surface within which said rounded projection rests.

4. A trailer hitch comprising a member adapted to form part of a vertically adjustable joint, a fixed bumper hook having a portion adapted to form the other part of said vertically adjustable joint and comprising a hooked arm adapted to hook over the upper edge of a vehicle bumper or the like, means for maintaining said bumper hook in vertically adjusted relation to said joint member, said fixed bumper hook having a central cavity therein and a vertical bore intersecting said cavity, an opposed movable bumper hook transversely pivoted within said cavity and adapted to hook under the lower edge of a bumper, said movable bumper hook having an opening therethrough of considerable extent and so positioned as to present open space to the projection of said vertical bore throughout a considerable range of movement of said movable bumper hook about its transverse pivotal axis, a threaded bolt passed freely through said bore and said opening, and a rider nut in threaded engagement with said bolt within the confines of said cavity and in engagement with the lower side of said movable bumper hook.

5. A trailer hitch comprising a member adapted to form part of a vertically adjustable joint, a fixed bumper hook having a portion adapted to form the other part of said vertically adjustable joint and comprising a hooked arm adapted to hook over the upper edge of a vehicle bumper or the like, means for maintaining said bumper hook in vertically adjusted relation to said joint member, said fixed bumper hook having a central cavity therein and a vertical bore intersecting said cavity, an opposed movable bumper hook transversely pivoted within said cavity and adapted to hook under the lower edge of a bumper, said movable bumper hook having an opening therethrough of considerable extent and so positioned as to present open space to the projection of said vertical bore throughout a considerable range of movement of said movable bumper hook about its transverse pivotal axis, a threaded bolt passed freely through said bore and said opening, and a rider nut in threaded engagement with said bolt within the confines of said cavity and in engagement with the lower side of said movable bumper hook, said rider nut being restrained against rotation by engagement with the sides of said cavity and the sides of said cavity being substantially vertical whereby rotation of said bolt causes vertical movement of said rider nut and pivotal movement of said movable bumper hook toward or away from said fixed bumper hook.

6. A trailer hitch comprising a member adapted to form part of a vertically adjustable joint, a fixed bumper hook having a portion adapted to form the other part of said vertically adjustable joint and comprising a hooked arm adapted to hook over the upper edge of a vehicle bumper or the like, means for maintaining said bumper hook in vertically adjusted relation to said joint member, said fixed bumper hook having a ventral cavity therein and a vertical bore intersecting said cavity, an opposed movable bumper hook transversely pivoted within said cavity and adapted to hook under the lower edge of a bumper, said movable bumper hook having an opening therethrough of considerable extent and so positioned as to present open space to the projection of said vertical bore throughout a considerable range of movement of said movable bumper hook about its transverse pivotal axis, a threaded bolt passed freely through said bore and said opening, and a rider nut in threaded engagement with said bolt within the confines of said cavity and in engagement with the lower side of said movable bumper hook, said rider nut being restrained against rotation by engagement with the sides of said cavity and the sides of said cavity being substantially vertical whereby rotation of said bolt causes vertical movement of said rider nut and pivotal movement of said movable bumper hook toward or away from said fixed bumper hook, said movable bumper hook having a rounded projection on its lower surface and said rider nut having a complementary rounded cavity in its upper surface within which said rounded projection rests.

7. A trailer hitch comprising a support having a vertically upstanding portion provided with a horizontally serrated side, a fixed bumper hook member having a base portion provided with a serrated side for mating with said serrated side of said support and having a projecting part adapted to hook over one edge of a vertical bumper or the like, means for releasably holding the serrated sides of said support and hook member in mated relation in a selected one of a plurality of vertically spaced positions, an opposed movable bumper hook pivotally mounted on said fixed hook member and adapted to hook over the other edge of said bumper, and means for releasably clamping said projection part of said fixed hook member and said movable bumper hook on said opposite edge portion of said bumper.

8. A trailer hitch comprising a fixed bumper hook adapted to hook over one edge of a vehicle bumper or the like, said fixed bumper hook having a central cavity therein and a vertical bore intersecting said cavity, an opposed movable bumper hook transversely pivoted within said cavity and adapted to hook under the opposite edge of said bumper, said movable bumper hook having an opening therethrough of considerable extent and so positioned as to present an open space to the projection of said vertical bore throughout a considerable range of movement of said movable bumper hook about its transverse pivotal axis, a threaded bolt freely passed through said bore and said opening, and a rider nut in threaded engagement with said bolt within the confines of said cavity and in engagement with the lower side of said movable bumper hook, said rider nut being restrained against rotation by engagement with the sides of said cavity and the sides of said cavity being substantially vertical whereby rotation of said bolt causes vertical movement of said rider nut and pivotal movement of said movable bumper hook toward or away from said fixed bumper hook.

JOSEPH DOUGLAS CATON.